US008350203B1

(12) United States Patent
Font et al.

(10) Patent No.: US 8,350,203 B1
(45) Date of Patent: Jan. 8, 2013

(54) CHARACTERIZATION AND TRAINING OF A PIEZOELECTRIC DEFORMABLE MIRROR

(75) Inventors: Carlos Font, Alexandria, VA (US); G Charmaine Gilbreath, Burke, VA (US); Freddie Santiago, Albuquerque, NM (US); Blerta Bajramaj, Alexandria, VA (US); David Kim, Greenbelt, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 182 days.

(21) Appl. No.: 13/040,958

(22) Filed: Mar. 4, 2011

Related U.S. Application Data

(60) Provisional application No. 61/310,909, filed on Mar. 5, 2010.

(51) Int. Cl.
*G01B 9/02* (2006.01)
(52) U.S. Cl. .................. 250/201.9; 356/520
(58) Field of Classification Search ............ 250/201.9, 250/201.1, 578.1; 356/520, 479, 497, 512
See application file for complete search history.

(56) References Cited

U.S. PATENT DOCUMENTS

| | | | | |
|---|---|---|---|---|
| 5,026,977 A * | 6/1991 | Hubbard, Jr. | ............ | 250/201.9 |
| 5,159,498 A * | 10/1992 | Hubbard, Jr. | ............ | 359/847 |
| 7,283,251 B1 * | 10/2007 | Tansey | ............ | 356/512 |
| 7,364,296 B2 * | 4/2008 | Miller et al. | ............ | 351/206 |
| 7,791,734 B2 * | 9/2010 | Olivier et al. | ............ | 356/479 |
| 2006/0058682 A1 * | 3/2006 | Miller et al. | ............ | 600/476 |
| 2007/0258095 A1 * | 11/2007 | Olivier et al. | ............ | 356/479 |
| 2011/0134436 A1 * | 6/2011 | Podoleanu et al. | ............ | 356/512 |
| 2012/0002163 A1 * | 1/2012 | Neal | ............ | 351/201 |

OTHER PUBLICATIONS

M. Booth, T. Wilson, H. Sun, T. Ota, and S. Kawata, "Methods for the characterization of deformable membrane mirrors," Appl. Opt. vol. 44, No. 24, pp. 5131-5139, (2005).
M. Lokev, O. Soloviev, and G. Vdovin, eds., "Adaptive Optics Guide," OKO Technologies, Delft, The Netherlands (2008).
N. Devaney, E. Dalimier, T. Farrell, D. Coburn, R. Mackey, D. Mackey, F. Laurent, E. Daly, and C. Dainty, "Correction of ocular and atmospheric wavefronts: a comparison of the performance of various deformable mirrors," App. Optics, vol. 47, No. 35, pp. 6550-6562, (2008).

* cited by examiner

*Primary Examiner* — Seung C Sohn
(74) *Attorney, Agent, or Firm* — Amy L. Ressing; L. George Legg

(57) ABSTRACT

A method of flattening a deformable mirror (DM) such as a piezoelectric DM to correct for distortion includes inputting an incident light beam into a reference beam optical path while blocking the DM response, recording a flat wavefront ($\Phi n$, R) as a reference wavefront from a reference mirror, blocking the reference beam to obtain a DM response, activating a close-loop mode of DM Control Software and computing iterations until a difference between the reference wavefront and the DM response is minimized, recording a wavefront created by the DM ($\Phi n$, DM) and the corresponding voltage vector (Vn) applied to the DM; and applying a voltage vector to the DM to thereby flatten the DM and correct for the distortion. The method is useful in an application such as for ground-to-space links at Short Wave Infrared (SWIR) wavelengths.

8 Claims, 12 Drawing Sheets

RMS = .32   RMS = .021

CHARACTERIZATION AND TRAINING OF A PIEZOELECTRIC DEFORMABLE MIRROR

CROSS-REFERENCE TO RELATED APPLICATIONS

This Application claims the benefit of U.S. Provisional Application 61/310,909 filed on Mar. 5, 2010, and incorporated herein by reference.

BACKGROUND OF THE INVENTION

A liquid crystal device can be use to create optical deformations onto a light beam and then having the deformable mirror to compensate and correct the corresponding wavefront. This method presents the disadvantage of the high cost of the device, limitations of wavefront able to generate, the loss of lights in the system, due to polarization, and the complex algorithm and wavefront reconstruction technique used. Martin Booth, Tony Wilson. Hong-Bo Sun, Taisuke Ota, and Satoshi Kawata, "Methods for the characterization of deformable membrane mirrors", Appl. Opt. Vol. 44, No. 24, 5131-5139 (2005).

Another method is measuring the influence response of the mirror per each actuator to create an influence matrix which describes the surface of the deformable of the mirror. Then a desire wavefront can be inserted into the simulation and solve the algorithm (different techniques) to calculate the voltage vector needed to apply to the actuators to recreate the desire wavefront. This method is not precise because of the differences between mirrors and the error already introduced when the influence function is measured. Also each actuator may have different response. This method won't respond or shown mechanical limitations of the devices unless they are previously prescribed into the simulation. An example of this is software is called MrFit*, from OKO Technologies. *M. Lokev, O. Soloviev, and G. Vdovin, eds., MrFit: Deformable mirror simulator, OKO Technologies, Delft, The Netherlands, http://www.okotech.com, (2008)

A commonly used method is to replace one of the flat mirrors on the setup with a curve mirror introducing curvature to the wavefront training the deformable mirror. This method is time consuming, because of the realignment of the setup every time a mirror is replaced. Also it is very costly due to the fact that different curve mirror with good optical quality are needed in order to obtain a wider range of aberration.

Referring now to FIGS. 1 and 2, a conventional free-space laser communication system 24 as described in U.S. Patent Application Publication No. 2003/0067657 and incorporated herein by reference is directed to supporting communication for fixed line-of-sight (LOS) points between structures such as buildings 10 via space based satellites or other relays 12, also used for comm links between trains 14, airships 16, aircraft 18, ships 20, and vehicles 22. A transceiver 24 (24a and 24b) is employed at each end of a comm. link and generally includes an interface 26 with output connected to data encoder 28 via fiber optics 30, the encoded data transferred from encoder 28 to a transmitter board 32 via coax cable 34. Board 32 superimposes the data on laser beams 36a-36c (produced by sources 35a-35c) with the optical characteristics modified by deformable mirrors 38a-38c. The adjustments are needed to correct for atmospheric distortions effects. The beams then pass through an aperture 42 in telescope body 40, which also receives laser signals 44 and directs these onto beam steering mirror 46. Mirror 46 focuses received laser signals 44 onto another deformable mirror 48 that also corrects the signals, generating a corrected signal 50.

System 24 also includes a wavefront sensing and processing section for adjusting the deformable mirrors, increasing the system complexity, cost, and reliability.

It would therefore be desirable to provide a method and system to characterize a deformable mirror without these disadvantages.

BRIEF SUMMARY OF THE INVENTION

According to the invention, a method of flattening a deformable mirror (DM) such as a piezoelectric DM to correct for distortion includes inputting an incident light beam into a reference beam optical path while blocking the DM response, recording a flat wavefront ($\Phi n$, R) as a reference wavefront from a reference mirror, blocking the reference beam to obtain a DM response, activating a close-loop mode of DM Control Software and computing iterations until a difference between the reference wavefront and the DM response is minimized, recording a wavefront created by the DM ($\Phi n$, DM) and the corresponding voltage vector (Vn) applied to the DM, and applying a voltage vector to the DM to thereby flatten the DM and correct for the distortion.

The signatures of a wavefront aberrated by the atmosphere are applied by the adaptive optics (AO) system and method to modify the wavefront to improve data throughput in a freespace laser communications channel, useful in an application such as for ground-to-space links at Short Wave Infrared (SWIR) wavelengths.

DETAILED DESCRIPTION OF THE INVENTION

Figure 1:
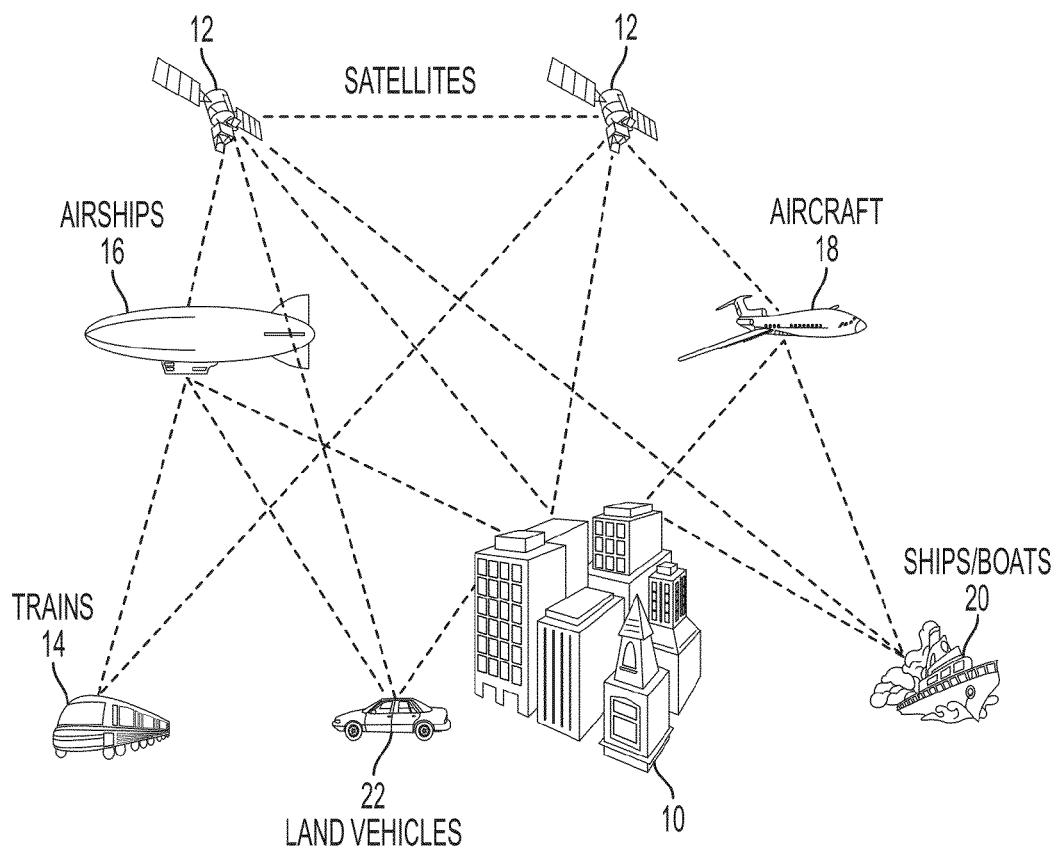
FIG. 1 is a general schematic of a conventional free-space laser communication system.
Figure 2:
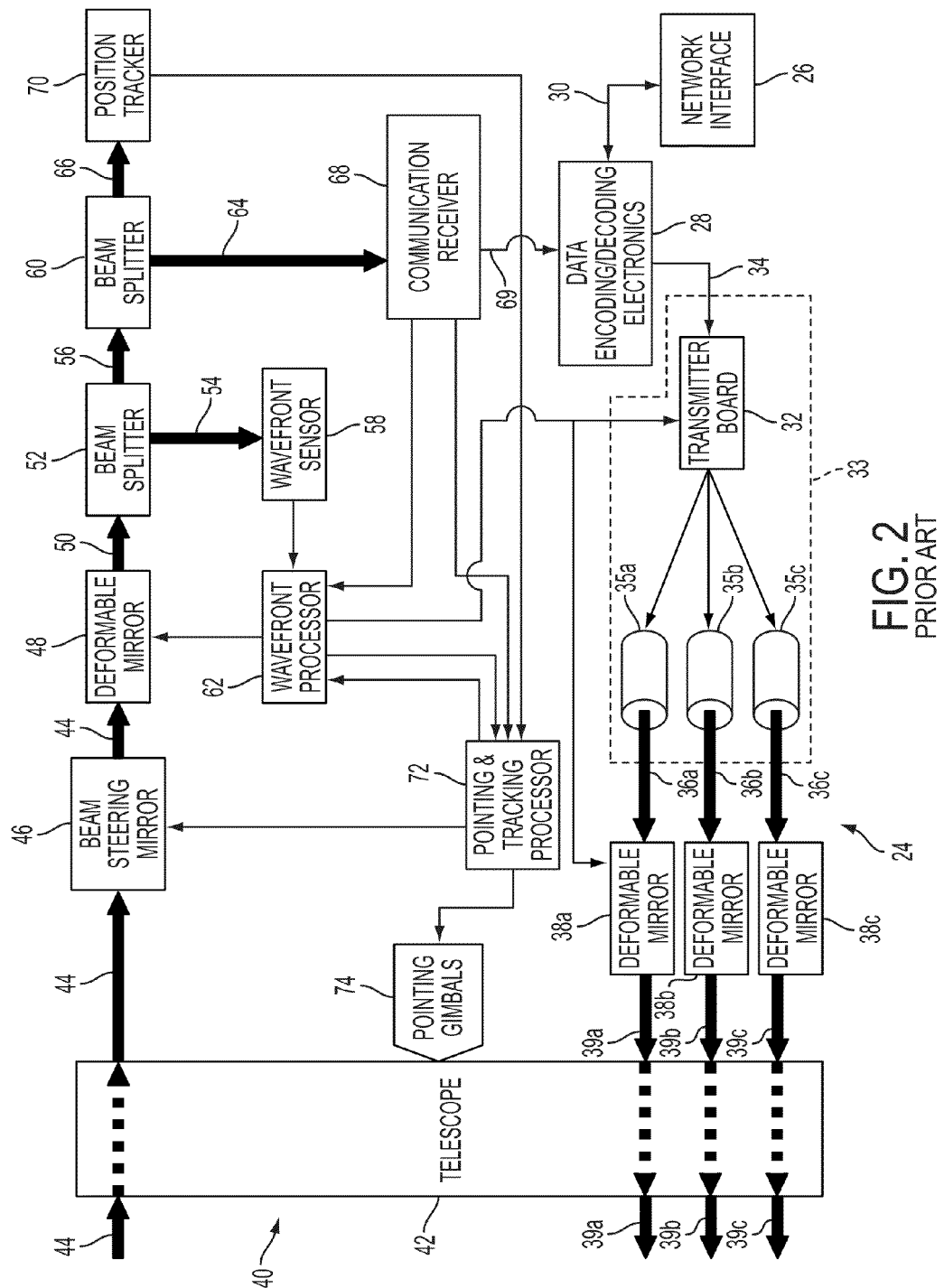
FIG. 2 is a system diagram of a prior art free-space laser communication system.
Figure 3:
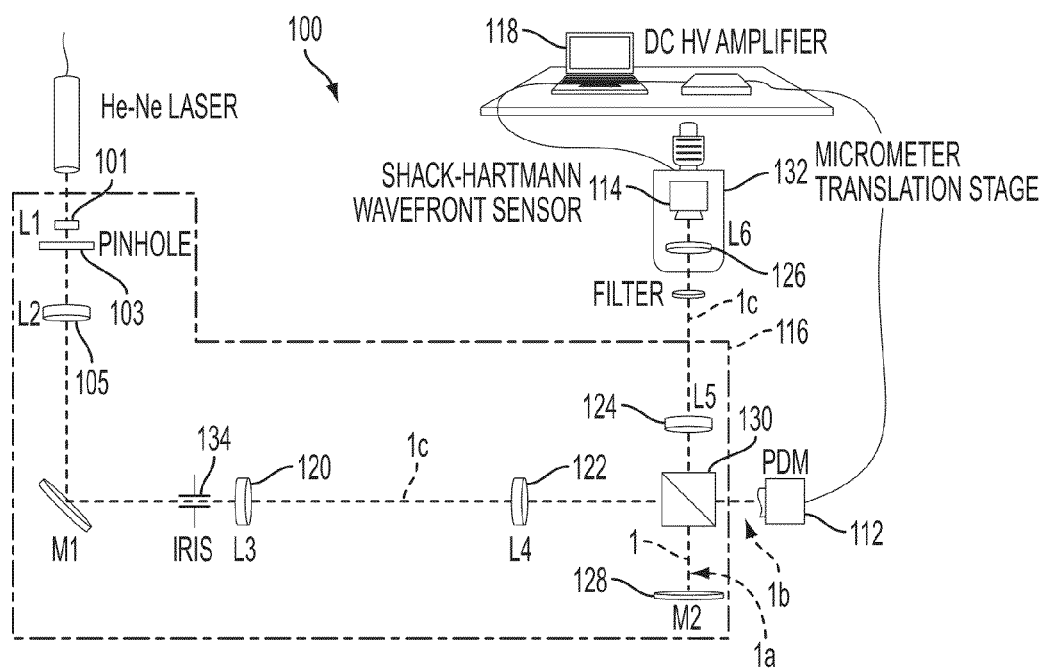
FIG. 3 is a schematic diagram of a deformable mirror characterization system according to the invention.

Referring now to FIG. 3, an adaptive optics system 100 applying the method of the invention includes a deformable mirror 112, e.g. a piezoelectric deformable mirror ("PDM"), a wavefront sensor (WFS) 114, an optics section 116, and a computer 118 programmed with real-time system control and post processing algorithms, e.g. as described in Robert K. Tyson, Introduction to Adaptive Optics. SPIE Press, Vol TT41, 2000. A piezoelectric deformable mirror (PDM) is a preferred component for handling the high intensities in ground-to-space laser links applications. In the test setup described herein, the wavefront sensor 114 is a Shack-Hartmann wavefront sensor, and the optics section 116 is a Twyman-Green interferometer. Commercially available control and processing software or alternatively customized software can be used for data acquisition and control.

This invention allows characterizing and train deformable mirrors to recreate different optical aberrations and also to evaluate what are their limits. For the procedure we use an optical setup similar than the one shown in FIG. 3. In this setup a first telescope comprises both lens 120 (L3) and lens 122 (L4) which were selected to present the optimal pupil entrance diameter on the deformable mirror for better performance. A second telescope comprising lens 124 (L5) and lens 126 (L6) adjusts the beam size to the right aperture size for the wavefront sensor 114. The process is repeated n times, depending the number of aberrations desired and how many times per aberration.

Training method to flat the DM 112
  Block the DM response and allow the light from reference beam 1 to go through the optical system in a reference beam optical path 1a.
  Record a flat wavefront ($\Phi_n$, R) as a reference from the reference mirror 128 (M2).
  Block reference beam 1 and unblock optical path 1b between DM 112 and WFS 114. A beamsplitter 130 separates the incident light into the two optical paths 1a and 1b as shown.
  On the computer 118 activate a close-loop mode of the DM Control Software and allow iterations until the difference between reference wavefront and DM response is minimized. Record the wavefront created by the DM ($\Phi_n$, DM) and the corresponding voltage vector ($V_n$) applied to the DM.

Training method to introduce aberrations using the DM
  Block DM optical path 1b
  Using the reference optical path 1a displace lens 126 (L6) positioned as shown in common optical path 1c to create focus/defocus (alternatively, replace lens with a lens with the prescription of the optical aberration desire on the system). Record wavefront with the optical aberration desired ($\Phi_n$, R).
  Put in the original position lens 126 (L6) (alternatively, replace the original lens 126 (L6)).
  Block the optical path 1a from the reference arm and unblock optical path 1b from the DM.
  Activate the close-loop mode and allow iterations until the difference between reference wavefront and DM response is minimized. Record the wavefront created by the DM ($\Phi_n$, DM) and the corresponding voltage vector ($V_n$) applied to the DM.
  Repeat the process for each desire optical aberration desired.

EXAMPLES

The first goal was to characterize the mirror's response; the second was to close the loop and train the mirror to provide focus and defocus for real-time divergence control; finally, the third goal was to extrapolate results to 1550 nm wavefront signatures.

Theory

The correction algorithm for real-time wavefront signature control can be summed up in Equation 1:

$$\Phi = \sum_{i=1}^{N} I_i V_i \quad (1)$$

where: $\Phi$ is the known wavefront, $I_i$ is influence function per actuator and $V_i$ is the voltage applied to each actuator. We begin by considering the influence matrices which are comprised of the influence response per actuator. The influence function refers to the characteristic shape corresponding to the mirror response to the action of a single actuator. The influence function that covers the whole mirror surface is called a "modal" function, while localized response is called "zonal", e.g. as described in M. Lokev, O. Soloviev, and G. Vdovin, eds., Adaptive Optics Guide, OKO Technologies, Delft, The Netherlands. This mirror consists of 19-piezoelectric actuators (N=19) with a 30 mm continuous face-sheet from OKO Technologies. Each of the 19 actuators can be individually controlled by voltages ranging from 0V to 400V. The PDM specifications are:

| Parameter | Value |
|---|---|
| Aperture | Circular, 30 mm diameter |
| Coating | Silver |
| Actuator Voltage | 0 to 400 V |
| Actuator Capacitance | 5 nF |
| Main Initial Aberration | Spherical |
| Actuators pitch | 7 mm |
| Stroke | 2 µm/100 V |

Figure 4:
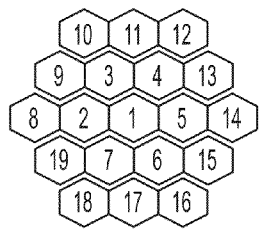
FIG. 4 shows a representative actuator distribution and numerical assignments of the piezoelectric actuators of a piezoelectric mirror according to the invention.

The actuator distribution and numerical assignments are shown in FIG. 4. Note that Actuator 1 is at the center, Actuators 2-7 form an inner ring, and Actuators 8-19 form the outer ring.

The corresponding weight of each actuator to the reference wavefront $\Phi$ can be calculated as described in Nicholas Devaney, Eugenie Dalimier, Thomas Farrell, Derek Coburn, Ruth Mackey, David Mackey, Francois Laurent, Elizabeth Daly, and Chris Dainty, "Correction of ocular and atmospheric wavefronts: a comparison of the performance of various deformable mirrors", App. Optics. 47(35), 6550-6562 (2008), and C. Paterson, I. Munro and J. C. Dainty, "A low cost adaptive optics system using a membrane mirror", Optics Express, 6(9), 175-185 (2000), as follows:

$$V = I^+ \Phi \quad (2)$$

where $I^+$ is the Moore-Penrose pseudo inverse defined as:

$$I^+ = (I^T I)^{-1} * I^T \quad (3)$$

Because $(I^T I)$ is a singular matrix and cannot be inverted, it is necessary to use Singular Value Decomposition (SVD) such that:

$$I^+ = S W^+ U^T \quad (4)$$

where U and S are orthogonal matrices and W is a diagonal matrix containing the singular values.

Figure 5:
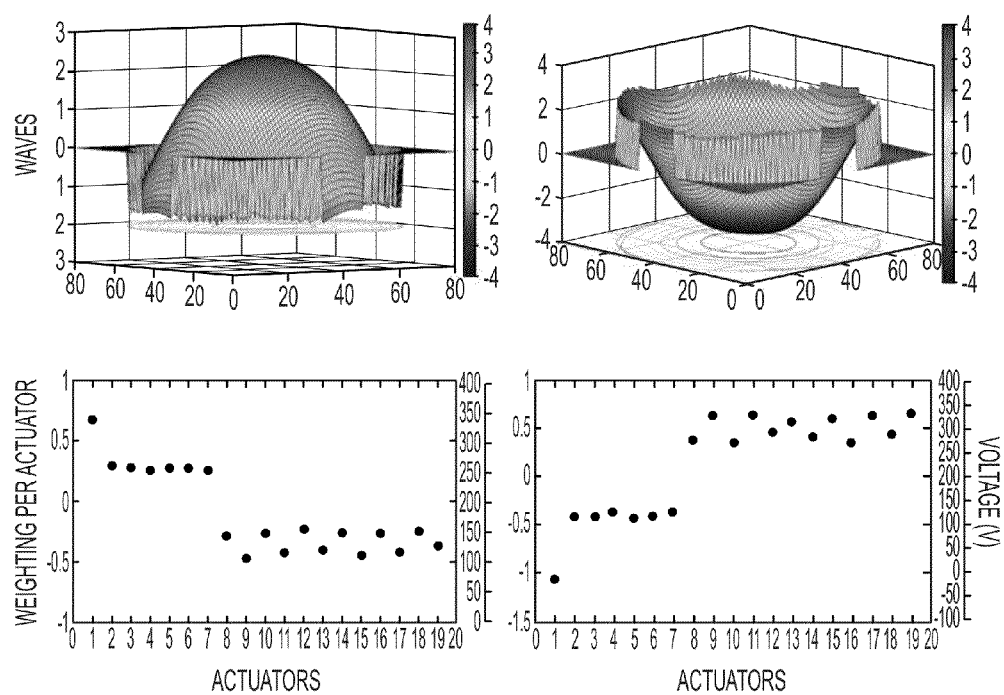
FIG. 5 is the resultant voltage matrices of the actuators of FIG. 4 according to the invention.

To visualize these results, we plotted the resultant voltage matrices. Some results are shown in FIG. 5. The desired wavefront was computed in MATLAB, which in turn generated the weight per actuator required by FrontSurfer (FS), the wavefront analysis and control system developed by OKO Technologies to control Shack-Hartmann wavefront sensors and deformable mirrors. These weights were then translated into the actual voltages which were applied to the actuators. The weights varied from −1 to +1 for voltages from 0V to 400V. Note the step characteristic of the patterns for the center, inner ring and outer ring. For both convex and concave surfaces, the voltage settings on the outer ring alternate due to the interzonal dependence. That is, when one actuator is pushed (or pulled), surface change is introduced near the adjacent actuator. To achieve the desired wavefront, less voltage is required to conform the surface. In fact, a maximum push/pull on the second actuator would result in greater surface deformation.

Methodology & Experimental Configuration

For one of our applications, we are interested in lower order AO systems to modify the laser transmit beam as it illuminates satellites in low earth orbit to mid earth orbit. To identify the specific characteristics of the PDM 112 as a key component in the low order AO configuration under consideration, we measured the PDM's response as a function of each actuator. We then experimentally quantified the PDM response for combined actuators. We measured the mirror's response to limiting drive voltages with respect to the asymmetric response over the wavefront that is created by "push" or "pull" by the actuators. The experimental configuration is shown in FIG. 3. Incorporated into the setup is the PDM 112 as shown. The parameters from the manufacturers of the OKO PDM are summarized above. We used a Shack-Hartmann wavefront sensor (WFS). The lenslet array consists of 127 sub-apertures, each with a focal length of approximately 18 mm. Other specifications are listed in Table 1, below. As can be seen from the configuration in FIG. 3, light from a 632 nm HeNe laser was collimated by a spatial filter comprising a lens 101, a pinhole 103, and a lens 105 and thereby directed through the interferometer 116. The beam was directed to the PDM 112, reflected back through beamsplitter 130, through a second telescope (and onto the wavefront sensor. The data was acquired and reduced using OKO's FrontSurfer in combination with customized programs developed in MATLAB. For the training of the mirror, the optics were translated through the effective focal point of the second telescope comprised of lens 124 (L5) and lens 126 (L6).

TABLE 1

Specifications for Shack-Hartmann Wavefront Sensor System using with OKO 16 Element PDM

| Parameter | Value |
|---|---|
| Camera Model | UI-2210M |
| Array Geometry | Hexagonal |
| Array Pitch | 300 Microns |
| Array Focal Distance | ~18 mm |
| Clear Aperture | 3.9 mm |
| Sub-Apertures | 127 |
| Processing Rate | ~28 fps |

Wavefront Characterization:

Initial characterization was done in an open loop mode using a flat mirror (M2) as a reference. Lens 120 (L3) and lens 122 (L4) were selected to present a 30 mm diameter beam onto the PDM to characterize the outer ring and onto M2 to provide a reference. L5 and L6 adjusted the beam size to 3 mm to under fill the pupil of the wavefront sensor and camera. Initial conditions were recorded by blocking the light between the beamspliter and the PDM and recording the results from the reference plane wave reflected from flat mirror 128 (M2). Contour distributions were captured by blocking the light between the beamsplitter and M2 and capturing the reflected light from the PDM, which was directed through L5 and L6 to the wavefront sensor and camera.

Closing the Loop:

The next step was to close the loop to measure system response and maximize corrections. The first goal was to create a closed-loop reference wavefront by "flattening" the mirror. Using the same optical configuration described above, we adjusted the incident beam diameter by partially closing the iris 134 located just before L3. Using this method, we reduced the beam diameter to the optimal entrance pupil diameter of the PDM which is 67% of the full pupil diameter for this specific type of PDM. Specifically, for this PDM, the beam diameter was adjusted to ~20 mm. Then we created and stored our reference wavefront. $\Phi_0$, using the high quality flat mirror, M2. M2 was then blocked and the beam directed to illuminate the PDM. The reflected beam from the PDM was directed to the WFS. Then we activated the closed-loop algorithm in FrontSurfer (FS). FS underwent about 100 iterations before the difference between the arbitrary wavefront and reference wavefront was minimized. The wavefront data and corresponding voltage values for each actuator were then recorded. The response rate was timed and diagnosed. Finally, the hysteresis evident in open-loop operation was quantified and compared to repeatability statistics for closed loop performance.

Training the System:

To train the PDM, we established a novel and straightforward procedure to characterize and measure the system's response. The telescope comprised L5 and L6 presented the beam to the WFS as shown in the figure. By translating L6 with a micropositioner 132, we were able to control the divergence/convergence of the wavefront in precise steps. Specifically, we blocked the PDM, translated L6 to create a known defocused/focused wavefront ($\Phi_1$) and recorded the wavefront. L6 was then returned to origin. M2 was blocked and the wavefront from the PDM was directed to the WFS through the original telescope configuration. The closed loop algorithm was activated. Now the PDM sought to recreate focus/defocus with $\Phi_2$, not a conjugate surface, which is typical of AO systems used for atmospheric correction. The phase information, metadata, and corresponding voltages for each actuator for this wavefront re-created by the PDM were then saved. The process was repeated throughout the range of interest. Specifically, we explored 70 mm in 1 mm steps (or 5 milliradians in 0.7 microradian steps at 632 nm).

5. Results

Figure 6:
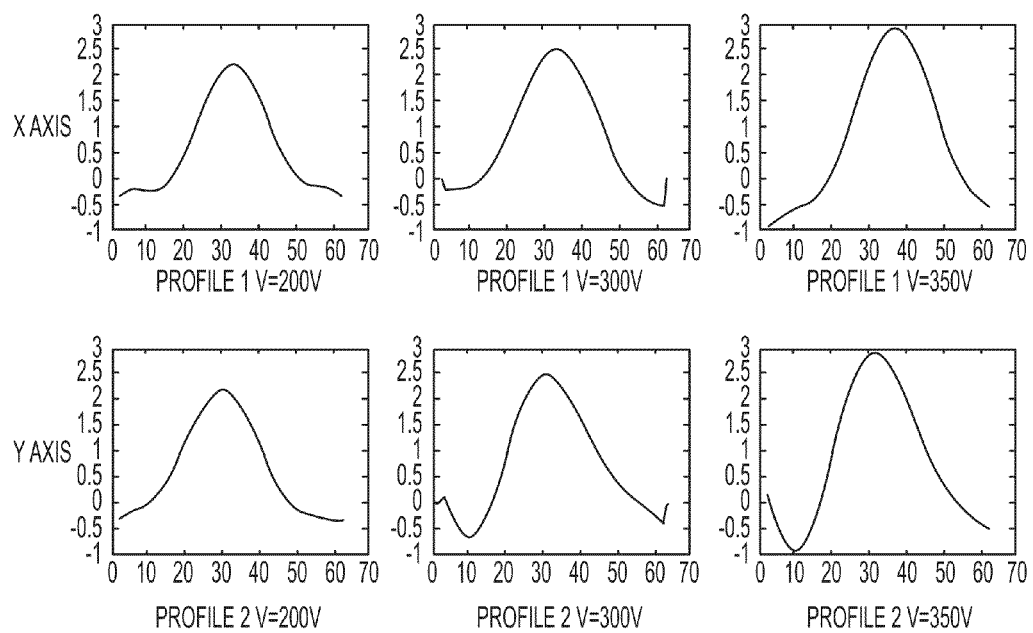
FIG. 6 shows the contours along the x and y axis from the three dimensional measured profiles for two of the actuators of the actuators of FIG. 4 according to the invention.

Open Loop Characterization:

The individual actuators were tested for symmetry and saturation levels by driving them at different voltages levels under open loop conditions. Some results for Actuators 1 and 2 are shown in FIG. 6. In these tests, single actuators were driven at different voltage levels. Each of the actuators was driven from 0V to 200V, 0V to 300V, and 0V to 350V. Contours along the x and y axis from the three dimensional measured profiles are shown. By inspection, we can see that 0V to 200V appears to be the more reliable range in terms of shape definition.

Figure 7:
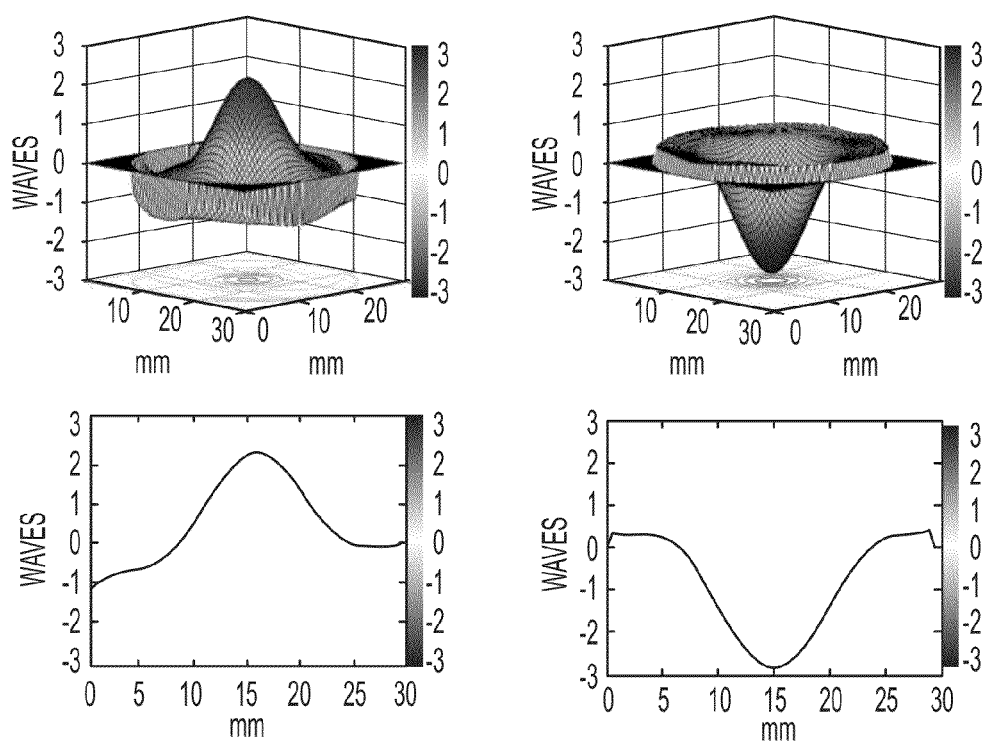
FIG. 7 are graphs showing the PDM's Push-Pull response when operated in open loop according to the invention.
Figure 8:
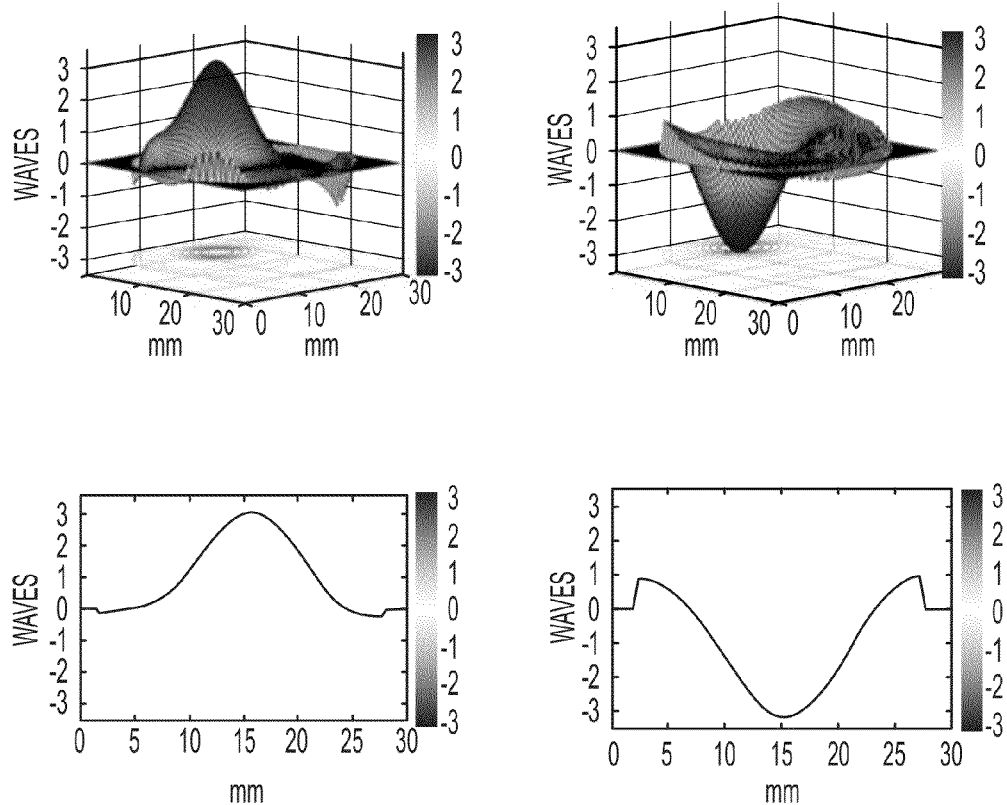
FIG. 8 is are graphs showing the PDM's Push-Pull response when operated in open loop according to the invention.
Figure 9:
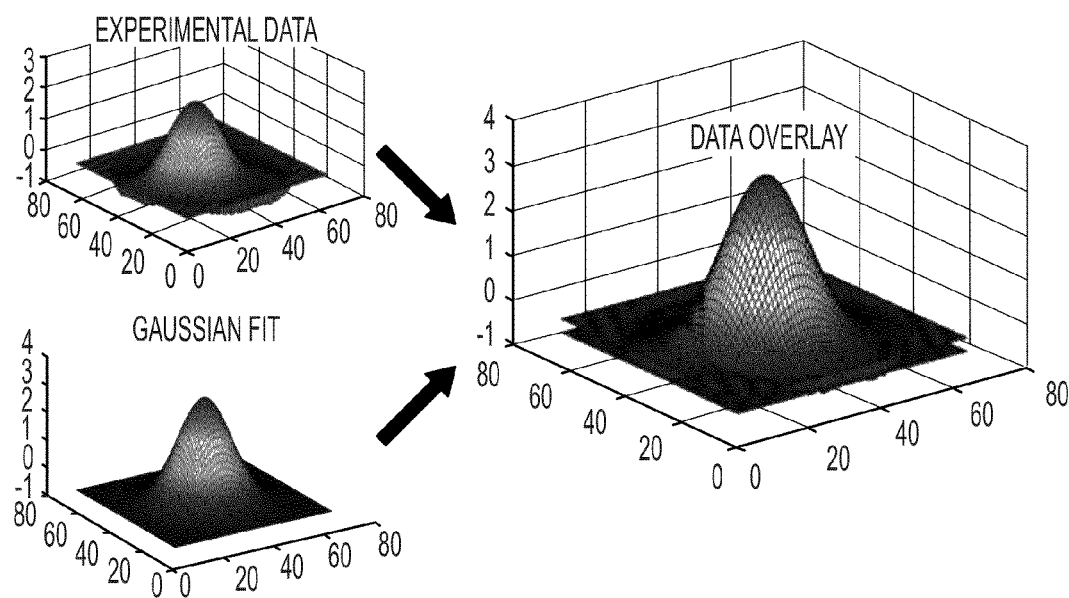
FIG. 9 is an overlay of a Gaussian fit over experimental data of a PDM according to the invention.

By comparing the response from all 19 actuators, we observed some degree of asymmetry in the PDM's Push-Pull response when operated in open loop. To create these responses, we placed a 200V bias on all actuators, then displaced Actuator 1 by +/−100V. In open loop, there was a clearly observable directional bias. That is, the PDM responded best when "pushed" rather than "pulled". This asymmetry can be seen by comparing the graphics in FIGS. 7 and 8. Influence on adjacent portions of deformable surface is also clearly shown. FIG. 9

The next task was to create the Influence Function Matrix for the PDM surface using the responses from each actuator. Optimized responses for the actuators for this type of PDM have been estimated to be Gaussian in form, e.g. as described in L. Huang, C. Rao and W. Jiang. "Modified Gaussian influence function of deformable mirror actuators", Optics Express, 16(1), 108-114 (2008). Therefore, Gaussian functional fits were generated using MATLAB. The experimental contours were then overlaid with these fits which enabled us to develop voltage matrices to estimate wavefronts that could be generated by this particular PDM. These results are shown in FIG. 9.

The combined contours in this figure show that the Influence Function Matrix cannot be readily generated from the estimated surface alone as the complex pattern of perturbations across the entire surface is not easily simulated with straightforward algorithms.

Figure 10:
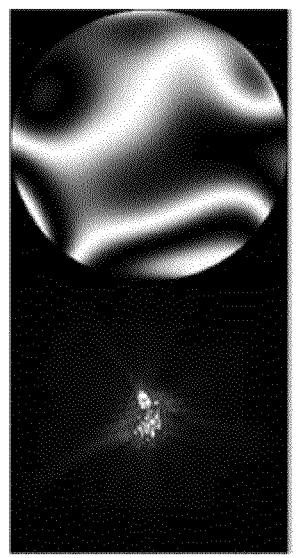
FIG. 10 is a comparison between open loop (left figure) and closed loop (right figure) response of a DM according to the invention.
Figure 10:
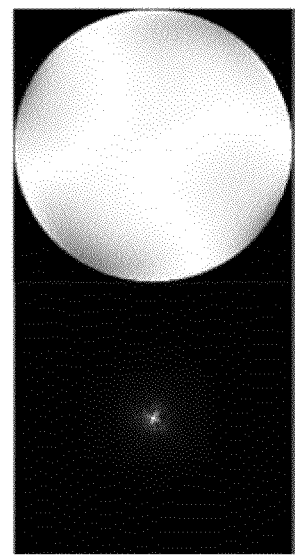

Closing the Loop:

We then closed the loop to engage the Shack-Hartmann wavefront sensor using the method described above: i.e. characterizing the mirror's response; closing the loop and training the mirror to provide focus and defocus for real-time divergence control; and finally, extrapolating results to 1550 nm wavefront signatures. Using M2, we established the flat reference by recording the voltage array values via FrontSurfer. The system was found to correct wavefronts to within 0.02 rms in 100 iterations at a rate of 28 iterations per second. The comparison between open loop (left figure) and closed loop response (right figure) is shown in FIG. 10.

Training the PDM:

In order to deterministically modify the wavefront, we return to Equation (1). ZEMAX was used to calculate the divergence that would be generated by displacing L6 (lens 126) in our system. Then L6 was moved by the ZEMAX-determined distance and the actual divergence measured. FrontSurfer generated the voltage values to be applied to the mirror (closed loop). After multiple iterations and rms minimization, FrontSurfer also calculated the Zernike coefficients for the measured wavefronts.

Figure 11:
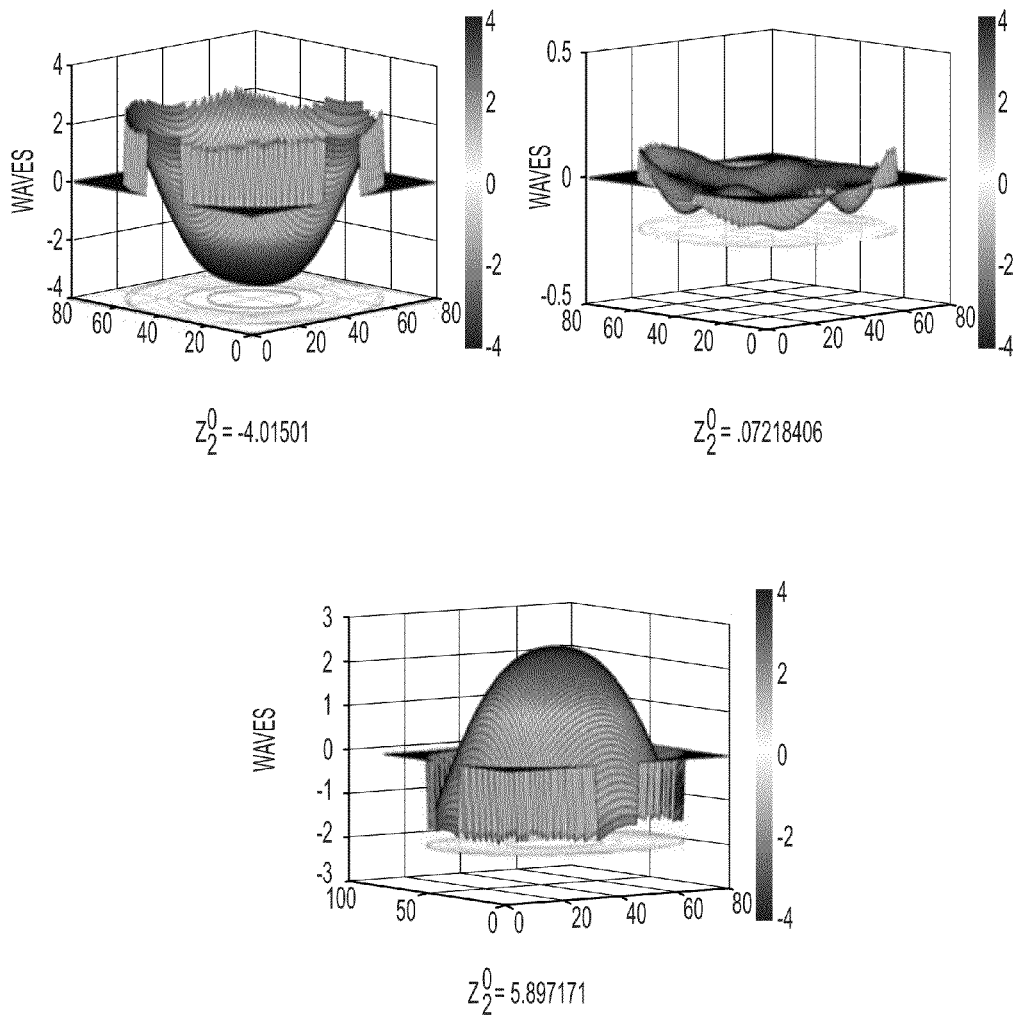
FIG. 11 is an example of a wavefront produced using the method according to the invention.

An example of a wavefront produced using this method with this PDM and optical configuration is shown in FIG. 11. In this case, we began with a beam which had 40 mRad divergence. We then stepped through −35 mm to +35 mm about the origin position. At the limits, the beam's divergence increased by 2.48 mRad to 42.26 mRad and decreased by 2.58 mRad to 37.52 mRad.

Figure 12:
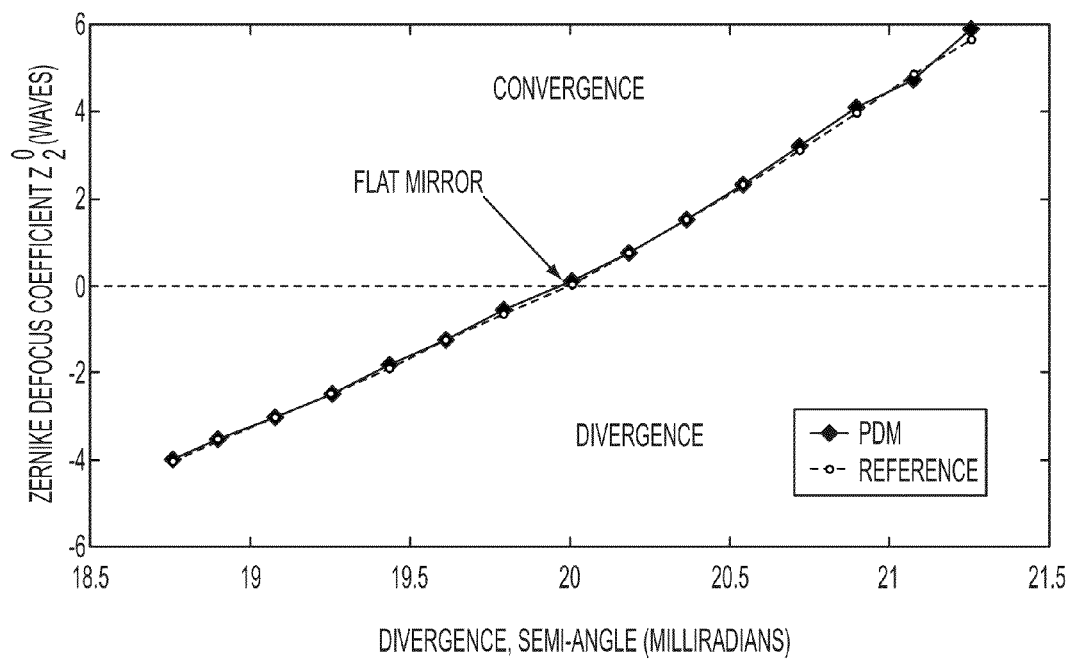
FIG. 12 is a graph showing the relationship between the ZEMAX-calculated half-angle divergence and the Zernike coefficients derived from the measured wavefronts obtained using the method according to the invention.

The relationship between the ZEMAX-calculated half-angle divergence and the Zernike coefficients derived from the measured wavefronts is shown in FIG. 12. The measured PDM response and the reference wavefronts generated are compared. The overlay of the two curves indicates minimized error between the prescribed and actual wavefronts. In closed-loop operation, the PDM can create approximately 5 mRad of focus or defocus at 632 nm. The error ranges between 0.2% and 4.5% depending on the region of operation. At the limits, the error increases because of the limitation of the actuators' stroke, which in turn, limits the maximum achievable lensing functionality over the faceplate of the mirror.

Figure 13:
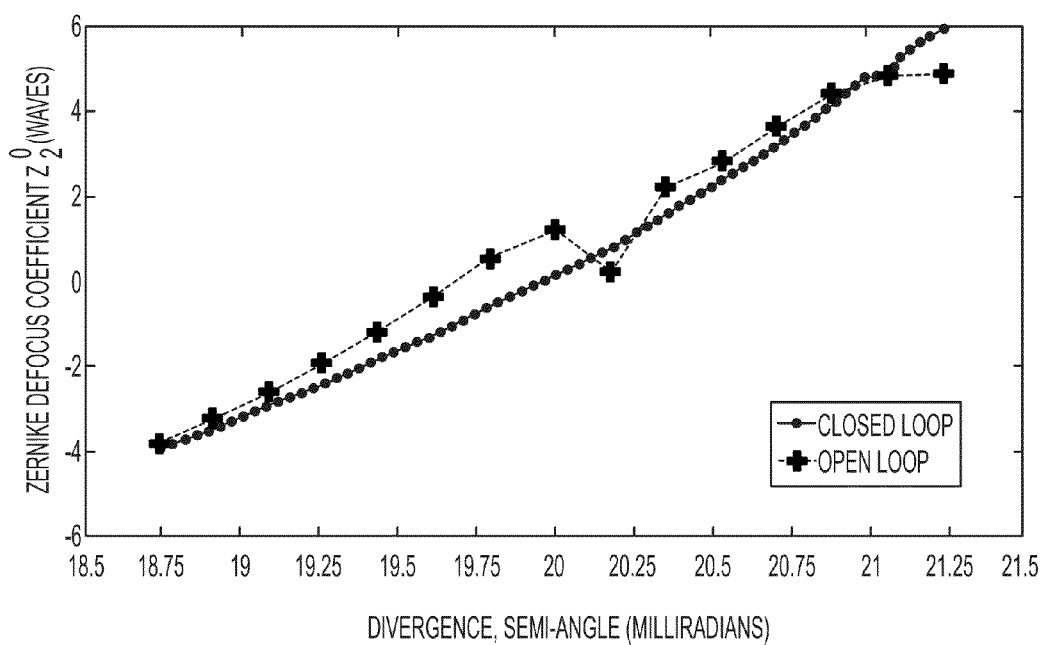
FIG. 13 is a graph showing the open-loop results compared with those generated in closed-loop mode and showing the resulting hysteresis when using an uncorrected mirror.

Finally, the focus/defocus voltages were applied to the PDM in an open-loop mode over the same range of interest. The open-loop results were then compared with those generated in closed-loop mode. The resulting hysteresis is shown in FIG. 13. This characteristic has been seen by other researchers as well as the manufacturer.

It should be noted that the method of the present invention can be accomplished by executing one or more sequences of one or more computer-readable instructions read into a memory of one or more computers from volatile or non-volatile computer-readable media capable of storing and/or transferring computer programs or computer-readable instructions for execution by one or more computers. Volatile computer readable media that can be used can include a compact disk, hard disk, floppy disk, tape, magneto-optical disk. PROM (EPROM, EEPROM, flash EPROM), DRAM, SRAM, SDRAM, or any other magnetic medium; punch card, paper tape, or any other physical medium. Non-volatile media can include a memory such as a dynamic memory in a computer. In addition, computer readable media that can be used to store and/or transmit instructions for carrying out methods described herein can include non-physical media such as an electromagnetic carrier wave, acoustic wave, or light wave such as those generated during radio wave and infrared data communications.

Thus, while the present invention has been described with respect to exemplary embodiments thereof, it will be understood by those of ordinary skill in the art that variations and modifications can be effected within the scope and spirit of the invention.

What is claimed as new and desired to be protected by Letters Patent of the United States is:

1. In an adaptive optics system comprising a deformable mirror (DM), a wavefront sensor (WFS), a computer programmed with real-time system control and post processing algorithms including DM Control Software, and an optics section including a beamsplitter positioned between the DM and the WFS reference mirror for splitting a light beam into an input light optical path and a reference beam optical path, a reference mirror positioned in the reference beam optical path and wherein the DM and the WFS are in the input light optical path, a method of flattening the DM to correct for a distortion comprising:

inputting an incident light beam into the reference beam optical path as a reference beam while blocking a DM response by blocking the input light optical path between the DM and the WFS;

recording a flat wavefront (Φn, R) as a reference wavefront from the reference mirror;

blocking the reference beam and unblocking the input light optical path between the DM and the WFS to obtain a DM response;

on the computer activating a close-loop mode of the DM Control Software and computing iterations until a difference between the reference wavefront and the DM response is minimized;

recording the wavefront created by the DM (Φn, DM) and the corresponding voltage vector (Vn) applied to the DM; and applying the voltage vector to the DM to thereby flatten the DM and correct for the distortion.

2. The method of claim 1, wherein the DM is a piezoelectric deformable mirror (PDM) with a plurality of actuators.

3. The method of claim 2, wherein the DM Control Software algorithm applies the equation $$\Phi = \sum_{i=1}^{N} I_i V_i$$

where: $\Phi$ is the known wavefront, $I_i$ is influence function per actuator and $V_i$ is the voltage applied to each actuator.

4. The method of claim 1, wherein the adaptive optics system is a component of a free-space laser communication system.

5. In an adaptive optics system comprising a deformable mirror (DM), a wavefront sensor (WFS), a computer programmed with real-time system control and post processing algorithms including DM Control Software, and an optics section including a beamsplitter positioned between the DM and the WFS reference mirror for splitting a light beam into an input light optical path and a reference beam optical path, a reference mirror positioned in the reference beam optical path, a replaceable or adjustable lens positioned between the beamsplitter and the WFS in a common optical path, and wherein the DM and the WFS are in the input light optical path, a method of training the DM to introduce an optical aberration comprising:

a) blocking the input light optical path between the DM and the WFS;
 b) generating a wavefront with the optical aberration introduced by moving the replaceable or adjustable lens from an initial position;
 c) recording the optically aberrated wavefront ($\Phi$n, R);
 d) returning the adjustable or replaceable lens to the initial position; blocking the reference beam optical path and unblocking the input light optical path between the DM and WFS;
 e) activating a close-loop mode of the DM Control Software and computing iterations until a difference between the reference wavefront and the DM response is minimized;
 f) recording the wavefront created by the DM ($\Phi$n,DM) and the corresponding voltage vector (Vn) applied to the DM; and
 repeating steps a)-f) for each optically aberrated wavefront desired.

6. The method of claim 5, wherein the DM is a piezoelectric deformable mirror (PDM) with a plurality of actuators.

7. The method of claim 6, wherein the DM Control Software algorithm applies the equation $$\Phi = \sum_{i=1}^{N} I_i V_i$$

where: $\Phi$ is the known wavefront, $I_i$ is influence function per actuator and $V_i$ is the voltage applied to each actuator.

8. The method of claim 5, wherein the adaptive optics system is a component of a free-space laser communication system.

* * * * *